June 6, 1933. C. E. WEHN 1,912,674
PENCIL
Filed May 25, 1931
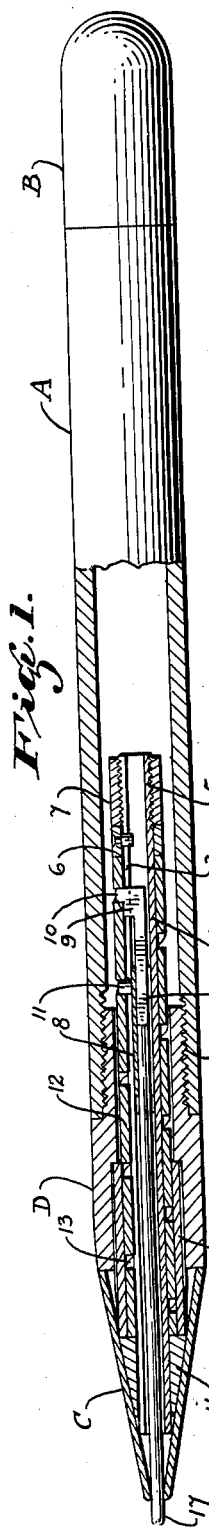
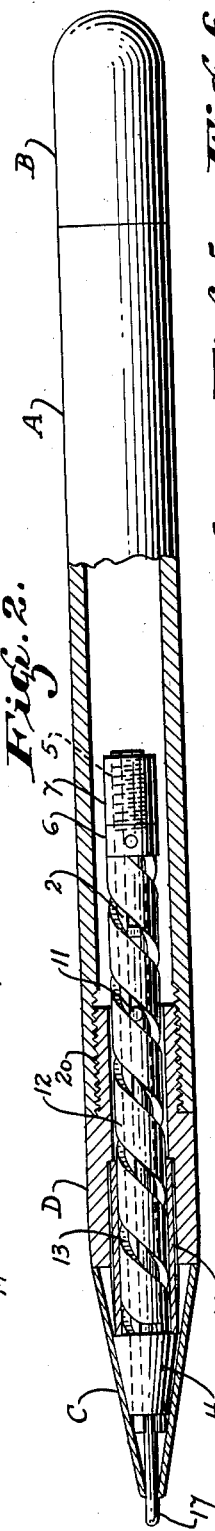
INVENTOR.
Charles E. Wehn
BY Townsend, Loftus & Abbett.
ATTORNEYS.

Patented June 6, 1933

1,912,674

UNITED STATES PATENT OFFICE

CHARLES E. WEHN, OF ALAMEDA, CALIFORNIA, ASSIGNOR TO LISTO PENCIL CORPORATION, OF ALAMEDA, CALIFORNIA, A CORPORATION OF CALIFORNIA

PENCIL

Application filed May 25, 1931. Serial No. 539,735.

This invention relates to pencils and especially to a mechanical type provided with mechanism for propelling, retracting and expelling a pencil lead.

Mechanical pencils provided with mechanism for propelling, retracting and expelling pencil leads are made in numerous forms but practically all that have come to my attention are so constructed that the mechanism is, practically speaking, inaccessible for the purpose of repairs. Furthermore, no means are provided for taking up wear, hence when a mechanism in a pencil of this character becomes slightly worn the mechanism moves too freely and control of the pencil lead is lost.

The object of the present invention is to generally improve and simplify the construction and operation of pencils of the character described; to provide a lead actuating mechanism which may be readily removed for adjustment, inspection and repair; and, further, to provide means whereby slack and wear may be taken up from time to time and perfect control of the pencil lead maintained.

The pencil is shown by way of illustration in the accompanying drawing, in which—

Fig. 1 is a longitudinal, central, vertical section of the pencil and mechanism contained therein.

Fig. 2 is a similar view showing parts of the mechanism in full.

Fig. 3 shows the detachable or removable end of the pencil and the mechanism mounted therein.

Fig. 4 is an enlarged cross section taken on line IV—IV of Fig. 3.

Fig. 5 is a perspective view of the lead gripper or carrier.

Fig. 6 is a perspective view of the expelling bar.

Fig. 7 is a perspective view of the locking washer.

Fig. 8 is a perspective view of the nut.

Fig. 9 is a perspective view of the feeding sleeve.

Fig. 10 is a perspective view of the guide tube.

Referring to the drawing in detail and particularly Figs. 1, 2 and 3, A indicates a pencil barrel, B a removable cap, C the pencil point or head, D an intermediate sleeve, and G the mechanism whereby a pencil lead is propelled, retracted and expelled.

The mechanism employed comprises a guide tube generally indicated at 2, see Fig. 10. This tube is slotted from end to end as indicated at 3. One end has secured thereon a cone-shaped stop collar 4 and the other end is threaded as indicated at 5 to receive a lock washer 6 and a nut 7, see Figs. 3, 7 and 8. The function of the lock washer and the nut 7 is important and will hereinafter be described.

Slidably mounted within the guide tube is a lead gripper or carrier generally indicated at 8, see Fig. 5. This carrier is constructed of spring metal and is split from end to end so as to frictionally grip and hold a pencil lead when inserted therein. Cooperating with the carrier 8 is an expelling bar 9, see Fig. 6. One end of the bar is provided with a projecting pin 10 and a similar pin 11 extends from the carrier. The pins 10 and 11 project through the slot 3 in the guide tube and they project into engagement with a feeding sleeve generally indicated at 12, see Figs. 1, 3 and 9. This sleeve is formed by helically winding a flat strip of metal and as such forms a helical groove 13 which extends from end to end thereof. The feeding sleeve surrounds the guide tube and it is secured against endwise movement thereon by the stop collar 4 and the lock washer 6 and nut 7. The tube 2 and sleeve 12 are, however, free to rotate with relation to each other as will hereinafter be described as such rotation is necessary in order that longitudinal movement may be transmitted to the carrier 8 and the expelling bar 9. The pins 10 and 11 of these members, by the way, project into the helical groove 13 of sleeve 12 and due to this projection and engagement with sleeve 12 longitudinal movement is imparted to the carrier and the expelling bar when the tube or the sleeve is rotated.

Secured on the outer end of the feeding sleeve 12 by a press fit or otherwise is a sleeve 14, see Figs. 1, 2 and 9. The exterior surface of this sleeve is fluted as shown and it forms a support for the intermediate sleeve or section D of the pencil. The members 12, 14 and D are secured to each other as a unit but they are longitudinally separable to permit repair as will hereinafter be described. The head member C is riveted, soldered, or otherwise secured to the cone-shaped collar 4. This is, in turn, secured to the tube 2, hence these members function as a unit.

In actual operation with the mechanism assembled as shown in Fig. 2 and with a pencil lead 17 inserted, it is possible to write with the pencil when the lead is projected as shown in Fig. 2. When the writer is through and wants to avoid breaking of the pencil point he merely grasps the sleeve D or barrel A in one hand and grips the head C with the other. By rotating the two members with relation to the other in one direction the pencil lead is retracted. On the other hand, if the lead is worn and it is desired to project the lead the parts are merely rotated in the opposite direction and the lead is projected and projection of the lead is possible until the pins 10 and 11 have traveled the full length of the helical groove and come into engagement with the stop collar 4. At this time the lead will be fully projected and will finally be expelled by the bar 9 and it is then necessary to retract the expelling bar by rotating the parts in a proper direction after which a new lead may be inserted. Further rotation in the same direction will then retract the carrier and the expelling bar and the lead and when fully retracted the carrier and bar will assume substantially the position shown in Fig. 2. When a pencil of this character is in constant use the pins 10 and 11 travel back and forth in the helical groove 13 of the feeding sleeve and the side walls of the groove become worn. When this happens the rotating parts rotate so freely that control of the lead is lost. Many forms of pencils employ a machanism of this character but as far as I know have no means for extracting the mechanism, nor any means for taking up the wear.

In the present instance if the parts become slack or worn it is only necessary to unscrew the barrel A from the sleeve D, a threaded connection 20 being provided for that purpose. When the barrel is unscrewed the mechanism is exposed as shown in Fig. 3. Then, by tightening up on the nut 7 the helically wound sleeve 12 is compressed, thus closing up on the walls forming the helical groove 13 and thereby taking up slack and wear. The pencil barrel may then be applied and the mechanism will function in a normal manner. In fact, any frictional resistance can be obtained by tightening the nut as much as desired.

Some individuals have a tendency to apply considerable pressure to the pencil lead when writing. If the mechanism is slightly worn and a writer of this character employs the pencil the pressure applied will merely push the lead inwardly in the mechanism, but where the mechanism is properly adjusted by tightening the nut 7 pressure on the lead will have no effect, in fact, it will break before it will move inwardly. Where individuals exert considerable pressure on the pencil lead it has been found that there is a tendency to compress the spirals of the feeding sleeve thus shortening the same and play then develops between the collar 4 and the lock washer 6 and the moment such play develops rotation is again too free and the lead is liable to be accidentally retracted when pressure is applied. Shortening of the feeding sleeve by compression can also be taken up by the lock nut and the washer.

In actual practice it seldom happens that any of the mechanical parts become broken but if they should break in a pencil constructed as here shown, the entire mechanism may be entirely removed to replace the broken part. To do so it is only necessary to unscrew the barrel A. This exposes the mechanism as shown in Fig. 3. By unscrewing the nut 7 and removing the lock washer, the carrier 8 and expelling bar 9 may be removed, hence if either of these parts are broken they may be readily replaced. The only other parts of the mechanism subject to breakage are the guide tube 2 and the feeding sleeve 12. These may be removed by separating the parts endwise and as such are also replaceable, hence by constructing the pencil as shown any part may be removed and renewed when desired and slack and play may be taken up from time to time as required.

While certain features of the present invention are more or less specifically described, I wish it understood that various changes may be resorted to within the scope of the appended claims. Similarly, that the materials and finish of the several parts employed may be such as the manufacturer may decided, or varying conditions or uses may demand.

Having thus described my invention, what I claim and desire to secure by Letters Patent is—

1. In a pencil of the character described, a head member, a lead propelling and retracting mechanism secured to the head member, a barrel inclosing a portion of said mechanism, and a sleeve interposed between the end of the barrel and the end of the head member and rotatable with relation to the head member and a connection between said sleeve and said mechanism whereby rotation of the sleeve relative to the head member will advance and retract a lead in said mechanism, said sleeve presenting a surface that may be gripped by the fingers whereby it may be rotated without grasping the barrel.

2. In a pencil of the character described, a head member, a lead propelling and retracting mechanism secured to the head member, a barrel inclosing a portion of said mechanism, a sleeve presenting a surface to be grasped by the fingers interposed between the barrel and head member and rotatable with relation to the head member, and a connection between said sleeve and said mechanism whereby rotation of the sleeve relative to the head member will advance and retract a lead in said mechanism, said barrel and sleeve being separably connected at a point intermediate the ends of the said mechanism whereby removal of the barrel will expose said mechanism for repairs.

3. In a pencil having a head, lead controlling mechanism supported by the head, and a barrel inclosing a portion of said mechanism, a sleeve adapted to be grasped independently of the barrel for operating said mechanism and interposed between the barrel and the head, and a threaded connection between the sleeve and barrel whereby the barrel may be removed to expose said mechanism for repair and replacement of parts.

CHARLES E. WEHN.